Aug. 23, 1949.　　　　C. W. MILLER　　　　2,479,953
RADAR DISPLAY SYSTEM
Filed Jan. 28, 1948
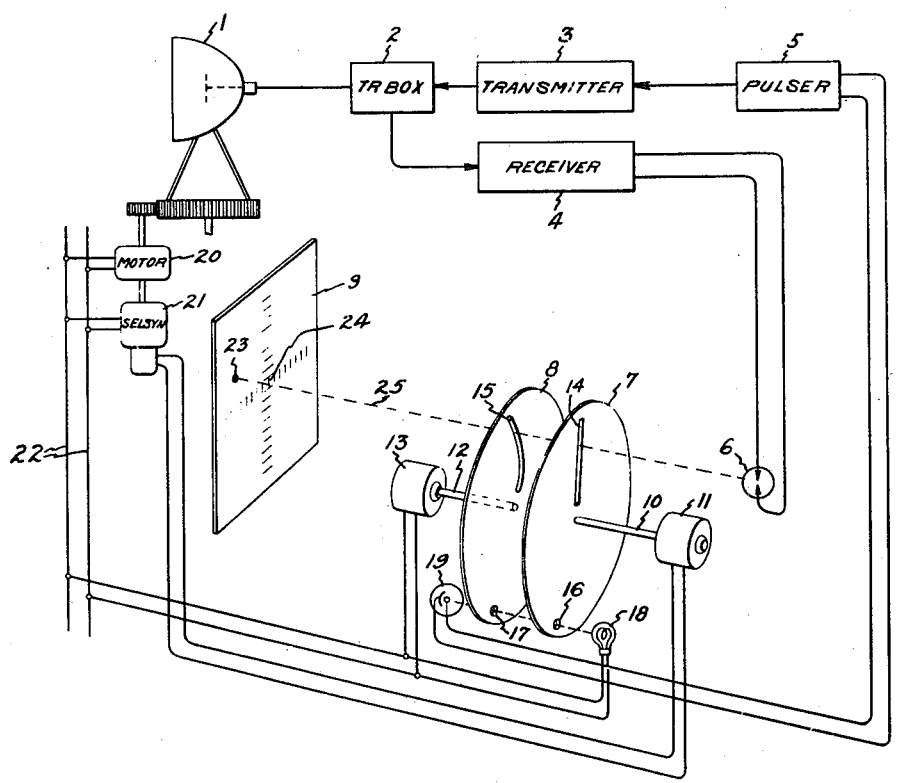
Inventor:
Charles W. Miller,
by Morton D Moore
His Attorney.

Patented Aug. 23, 1949

2,479,953

UNITED STATES PATENT OFFICE 2,479,953

RADAR DISPLAY SYSTEM

Charles W. Miller, Sale, England, assignor to General Electric Company, a corporation of New York Application January 28, 1948, Serial No. 4,768
In Great Britain January 3, 1947

1 Claim. (Cl. 343—11)

My invention relates to radar equipment and, more particularly, to indicating apparatus for displaying the echoes which arrive at the receiver from targets.

In a radar system the range is a measure of the time required for a high frequency pulse to travel from the transmitter to an obstacle and for a portion of the energy to be reflected back to the receiver. In order to utilize such a system, it is necessary to have some means for displaying the information received. It is also desirable to present the range simultaneously with the direction of the obstacle causing the reflection.

It is an object of my invention to provide an improved radar presentation system producing an image of great brilliance.

A further object of my invention is to provide a system of radar presentation adaptable for projection on a screen.

A further object of my invention is to provide an improved system of radar signal presentation that will simultaneously indicate both range and direction of the obstacle causing the echoes.

For additional objects and advantages, and for a better understanding of the invention, attention is now directed to the following description and accompanying drawing, and also to the appended claims in which the features of the invention believed to be novel are particularly pointed out.

The single figure of the drawing is a schematic diagram of a radar system containing one embodiment of my invention.

Referring now to the drawing, those elements of the system whose details do not in themselves form part of the invention and which are well known to those skilled in the art have been shown only diagrammatically. Detailed description of such units will be omitted for brevity.

An antenna 1, which may be rotated about a vertical axis, is connected to a transmitter 3 and a receiver 4 by means of any known form of transmit-receive device, or TR box, 2. A pulser 5 causes the transmitter 3 to impress recurrent pulses of high frequency an antenna 1. TR box 2 protects receiver 4 from the intense transmitted pulses and permits reflected pulses received at antenna 1 to be supplied to receiver 4 without attenuation, as is well known. A discharge device 6, which may be any suitable discharge lamp, is connected to the output from the receiver 4 and provides a source of light modulated by the received pulses.

The modulated light source 6 is mounted by any suitable means behind a disc 7 that has a radial slot 14 and an aperture 16. The disc 7 is mounted on a shaft 10 driven by a motor 11. The motor 11 is controlled by a Selsyn system 21 connected to an antenna drive motor 20. This provides a control from the antenna system to rotate the disc 7 so that the angle which the radial slot makes with a fixed reference position corresponds to the direction of the received echoes. A second disc 8, having a spiral slot 15 and aperture 17, is mounted coaxially with the disc 7 on a shaft 12 of a constant speed motor 13.

A constant light source 18 is also mounted behind the disc 7 so that when the apertures 16 and 17 are aligned, light from source 18 energizes a photoelectric cell 19. A screen 9 is mounted in a suitable manner coaxially with the discs 7 and 8.

Pulses from the receiver 4 modulate the light 6 at time instants which are in accordance with the time instants at which the echoes arrive. Light from the source 6 passes through the aligned portions of slots 14 and 15 in the discs 7 and 8 and produces a spot 23 on the screen 9, which may be calibrated for range and direction.

Preferably, in carrying out the invention, range is indicated on screen 9 by radial displacement of spot 23 from a center 24 and direction is indicated by the angular position of spot 23 about the same center. For example, in navigation equipment in which signals are transmitted over a range of compass bearings the display may give a direct angular indication of the bearing of the echo, and the angular displacement of the light beam display may be through the full 360 deg. However, if desired, the display may be compressed so that 180 degree displacement, for example, may correspond to 360 degree variation of echo reception, or conversely it may be expanded.

The modulation of the light source 6 may also be accomplished in any suitable manner. It need not be visible light but may be infra-red or ultra-violet, and in such cases a fluorescent screen may be necessary.

The rotatable apertured discs 7 and 8 coact to displace the light beam 25 from source 6 in the following manner. The disc 7 is provided with a radial aperture 14 and is rotated so that the angle which the aperture 14 makes, with respect to a fixed reference position, corresponds with the direction of the echoes and is controlled from the aerial system. The disc 8 has a spiral slot 15 and rotates at a relatively high constant speed. When the two rotatable discs 7 and 8 are placed coaxially so that the light may be passed successfully through the apertures, a series of successive radial sweeps are thus produced by the spiral slot sweeping over the radial slots. The angular direction of the successive radial sweeps corresponds with the direction from which the echoes are being received. The term "spiral" implies a curve on the disc such that the radius vector is some simple function of angular displacement and that as the disc rotates relatively, a time base of the desired form is produced. The term "spiral" as used herein is not to be construed as limiting the curve to the simple form $r=a\theta$. However, it is preferable to determine the form of spiral slot 15 such that if the disc 8 is rotated at an angular velocity of $\omega$ radians per second behind the disc 7, a spot of light due to the beam through the overlap will move radially outward with constant velocity. That is, the displacement of the spot will then be directly proportional to time.

For practical purposes the disc 7 can be considered to be stationary since in practice its velocity will be negligible compared with that of disc 8. Then if the slot 15 is of the preferred shape described above, the radius vector of the point on the curve, which is passing a given angular position, is proportional to time.

In this case $\theta$, the angular position, is equal to $\theta t$ and we say $r=kt$
Thus the curve is given by $r=k^\theta/\omega$ Where K is a constant determining for a constant value of the speed of the time pass. If the discs 7 and 8 are both rotating, then $\omega$ is replaced by the difference between the angular velocity of the discs. In other words, it is their relative angular velocity. Similar reasoning may be applied to the determination of the form of the spiral so that the time base produced may be non-linear with respect to time in any desired fashion.

It will be appreciated that since the time base velocity is dependent upon this relative angular velocity, it will be required in practice that the disc 8 be rotated at constant velocity to insure a constant time base velocity. It may be desired that more than one spiral slot be cut from the disc 8 so that a number of time bases may be produced by one revolutiton of the disc 8.

The light source is modulated so that it is only effective to produce a beam when an echo is being received and the transmitter is so synchronized with the rotating disc that the radial distance at which the beam appears from center 24 is a measure of the time required by the signal in making the outward and return journey. Hence, it gives a measure of the range of the obstacle producing the reflection. The transmitter is synchronized with the disc by the corresponding apertures 16 and 17 in the two discs which, when in alignment, allow light from the constant light source 18 to fall on the photocell 19 and in turn cause a synchronizing pulse to be sent to the transmitter. If the disc 8 has a number of spiral slots it must also have an equal number of apertures for tripping the transmitter.

In the example described above, the disc 8 rotates at high speed and the disc 7 at slow speed. It will be appreciated, however, that these conditions may be varied and other systems of slots may be employed to produce radial or spiral time bases. For example, a spiral time base may be produced by rotating the radial slot at high speed or two curved slots may be rotated in opposite directions to produce a radial time base which is caused to rotate by suitably selecting the speed differential.

Deflection of the beam may also be carried out by rotating mirrors or reflector prisms which are moved to provide the radial sweeps and which are mounted on a carrier that is rotatable so as to position the sweeps angularly.

The driving motor 13 for the disc 8 may throw a shadow on the display but this blanking out the center of the display can be eliminated by having the disc edge driven.

In practice, unless the light source is of high intensity and can produce illumination over the whole of the disc 7, it will preferably be necessary to attach the light source to a carrier on the disc 7 and to focus the light along the radial slot. This can be done by using slip rings or other well known methods for energizing the light source.

As illustrated, the rays of light are assumed to travel from the scanning system to the screen. In practice this will involve a lens system which has been omitted for simplicity.

While certain specific embodiments have been shown and described, it will be understood that various modifications may be made without departing from the invention. The appended claims are, therefore, intended to cover any such modifications within the true spirit and scope of the invention.

What I claim as new and desire to secure by Letters Patent of the United States is:

A radar system comprising a directive antenna rotatable in azimuth, a transmitter for supplying pulses to said antenna, a pulse receiver for detecting echoes received from objects toward which said antenna is directed, a source of light modulated by said receiver to produce a sudden change in light intensity in response to each said detected echo, means for forming said light into a scanning beam comprising a pair of independently rotatable, concentric discs, a first one of said discs having a radial slot and being positively synchronized in angular position with the azimuth position of said antenna, the second one of said disks having a spiral slot, means for independently rotating said second disc at a high speed as compared to the maximum speed of antenna rotation, thereby to cause the beam of light passing through said disks to sweep along a radial axis corresponding to antenna azimuth position, an additional aperture of small dimensions in each disc, said apertures being axially aligned in one relative angular position of said discs, a second unmodulated light source, a photoelectric cell, said second source being arranged to direct a flash of light upon said cell once per revolution of said second disc at an angular position of said first disc corresponding to the start of each said radial sweep of said first beam, and means utilizing the output of said cell to synchronize the pulses supplied from said transmitter to said antenna.

CHARLES W. MILLER.

REFERENCES CITED

The following references are of record in the file of this patent:

UNITED STATES PATENTS

| Number | Name | Date |
| --- | --- | --- |
| 2,237,193 | Mobsby | Apr. 1, 1941 |
| 2,411,520 | Capen | Nov. 26, 1946 |
| 2,412,669 | Bedford | Dec. 17, 1946 |
| 2,412,670 | Epstein | Dec. 17, 1946 |
| 2,426,245 | Skellett | Aug. 26, 1947 |
| 2,449,977 | Busignies | Sept. 28, 1948 |

Certificate of Correction

Patent No. 2,479,953 August 23, 1949

CHARLES W. MILLER

It is hereby certified that error appears in the printed specification of the above numbered patent requiring correction as follows:

Column 3, line 28, for "$\theta t$" read $\omega t$;

and that the said Letters Patent should be read with this correction therein that the same may conform to the record of the case in the Patent Office.

Signed and sealed this 21st day of March, A. D. 1950.

[SEAL]

THOMAS F. MURPHY,
*Assistant Commissioner of Patents.*